Figure 3:
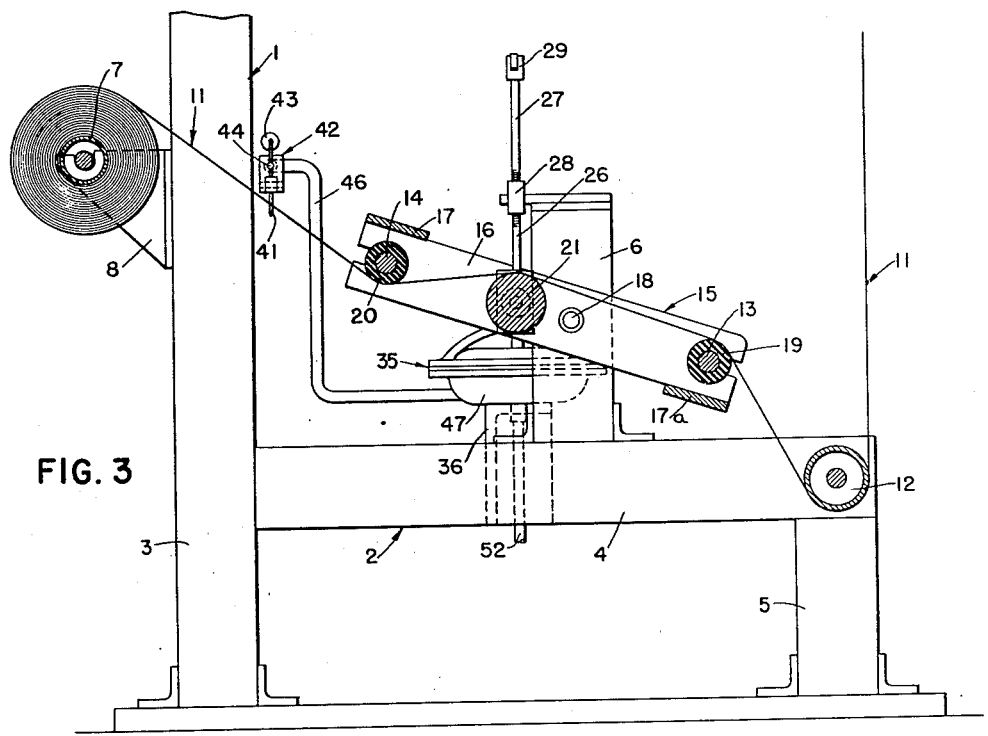

July 12, 1949.    R. E. SOLLIDAY    2,476,070
AUTOMATIC WIDTH CONTROL AND FABRIC GUIDE
Filed April 25, 1947    2 Sheets-Sheet 1
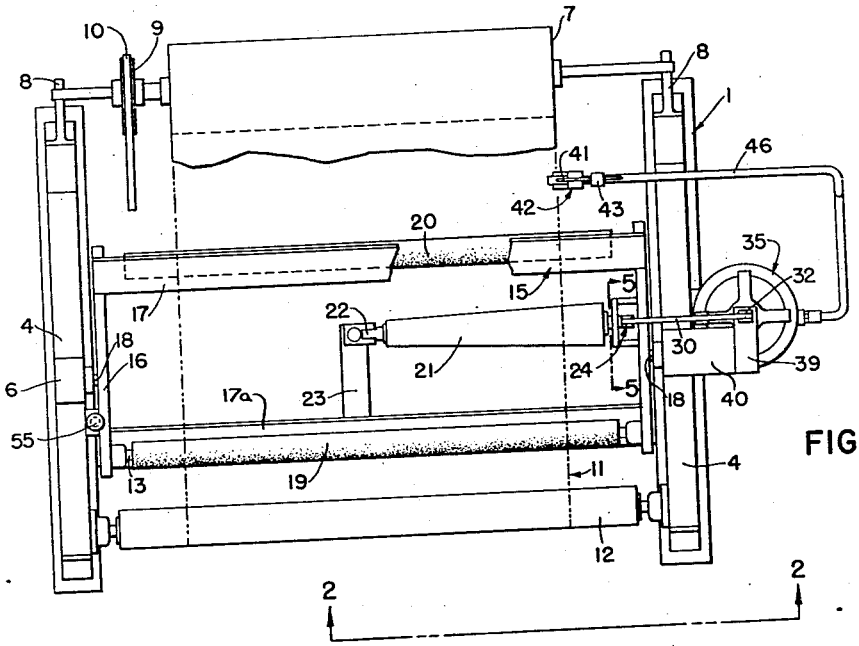
FIG. 1
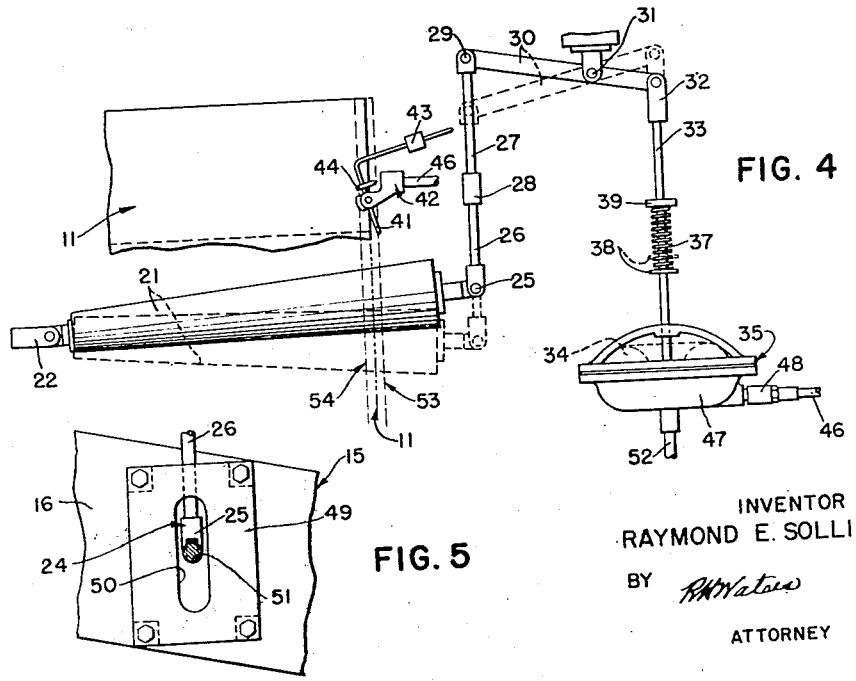
FIG. 4
FIG. 5
INVENTOR
RAYMOND E. SOLLIDAY
BY
ATTORNEY July 12, 1949.  R. E. SOLLIDAY  2,476,070
AUTOMATIC WIDTH CONTROL AND FABRIC GUIDE
Filed April 25, 1947  2 Sheets—Sheet 2

INVENTOR
RAYMOND E. SOLLIDAY
BY
ATTORNEY

Patented July 12, 1949

2,476,070

UNITED STATES PATENT OFFICE 2,476,070

AUTOMATIC WIDTH CONTROL AND FABRIC GUIDE

Raymond E. Solliday, Akron, Ohio, assignor to Wingfoot Corporation, Akron, Ohio, a corporation of Delaware Application April 25, 1947, Serial No. 743,819

7 Claims. (Cl. 26—63)

The present invention relates to means for guiding and controlling the width of fabric and the like in the course of a beaming operation. More particularly, the invention is concerned with novel means for maintaining the uniform width and edge relationship of successive layers of fabric and the like upon a beam in a wind-up apparatus.

In the beaming of cloth, fabric, cord systems, and the like such, for example, as tire fabric employed in the manufacture of pneumatic tire carcasses, it is extremely difficult to maintain the fabric in its fully expanded condition and to insure a smooth and uniform edge for the fabric package as it is accumulated upon the beam. Certain forms of expanding mechanisms and guides have been devised for such purposes, but many of these may be said to be impractical because of their complicated and expensive construction. Such conventional guiding and width control devices do not satisfactorily aid in accomplishing the beaming of tire fabrics which employ a large number of parallel warps and a minimum number of widely spaced woof or tie cords.

One of the important objects of the present invention, therefore, is the provision of means capable of maintaining the uniform over-all width of the fabric as it is collected upon a beam.

A further object of the present invention is to provide a means for guiding the fabric widthwise to prevent the overrunning of the edges of successive layers of fabric in the course of the wind-up operation during which the fabric package is formed.

Another object of the present invention is the provision of a form of automatically operable width control and edge guide means for employment in the beaming of the fabric which is simple in construction and capable of being economically manufactured.

By way of fulfilment of the foregoing objects, the present invention provides means for maintaining the uniform width and edge relation of successive layers of fabric upon a beam for wind-up apparatus which comprises, among other things, means disposed in the path of the fabric and in contact therewith for expanding the same to spread the edges apart uniformly throughout the length of the fabric and means in contact with at least one edge of the fabric for actuation by the lateral movement of an edge of the fabric to facilitate the centering of the same with respect to the ends of the beam.

Other objects and advantages of the present invention will become apparent as the description of one embodiment of the invention illustrated in the accompanying drawings proceeds.

Figure 2:
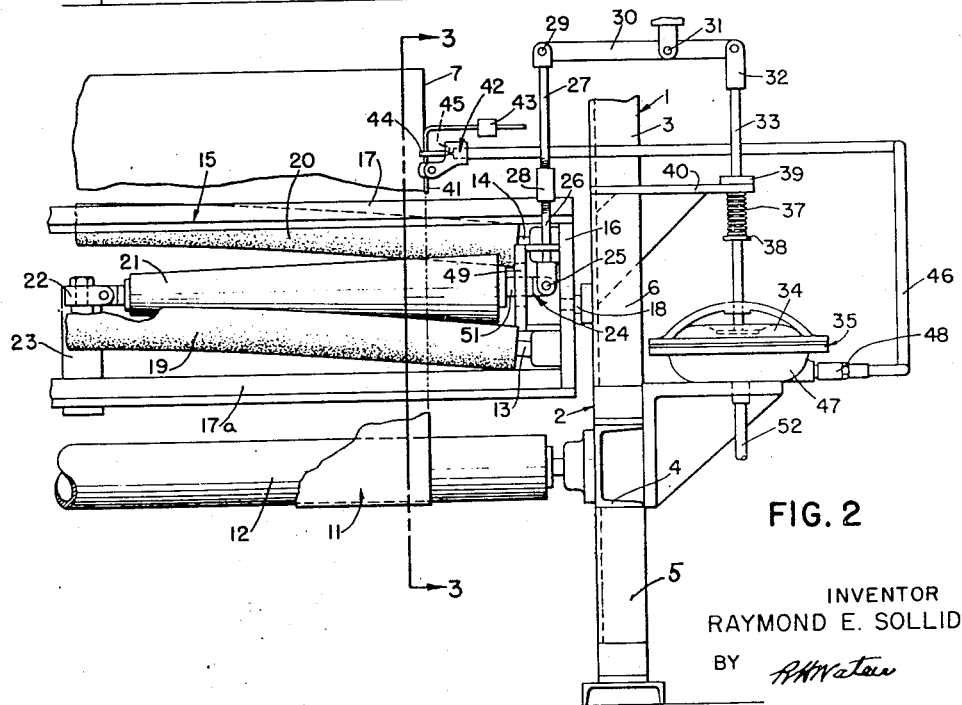

In the drawings, Fig. 1 represents a plan view of one form of wind-up mechanism embodying the principles of the present invention employed in the beaming of fabric and the like fabricated on a conventional loom or other similar web-forming device. Fig. 2 is a partial elevation of the beaming apparatus of Fig. 1 as seen from the line 2—2 therein. Fig. 3 is a vertical cross-section of the apparatus of Fig. 2 as seen from the line 3—3 therein. Fig. 4 is a fragmentary diagrammatic representation of the elements of the apparatus of the present invention illustrating the operation thereof. Fig. 5 is a partial cross-section taken along the line 5—5 in Fig. 1.

In Fig. 1 of the drawings, the reference numeral 1 indicates generally a form of wind-up apparatus which embodies the teachings of the present invention. It is the purpose of the wind-up apparatus 1 to receive a supply of fabric and the like from a conventional loom, weaving apparatus, or other similar web-forming device (not shown) and to collect the same in the form of a package upon a beam which is thereafter transported to additional fabricating equipment, depending upon the nature of the manufacturing operations in which the fabric is to be employed. It is the chief purpose of the wind-up apparatus to achieve the building up of the fabric package upon the beam in such a way that the fabric is expanded to its full edge-to-edge dimension and with the edges of successive layers of the fabric uniform throughout the entire package.

The wind-up apparatus 1, as illustrated in Fig. 3, comprises a framework or structure 2 embodying a pair of uprights 3, horizontally disposed members 4, and vertical supports 5. Supported by each of the horizontal members 4 is a vertical member 6. A collecting cylinder or beam 7 is supported at one end of the wind-up apparatus 1 as by means of a pair of brackets 8 which are, in turn, secured to the uprights 3. The beam 7 is adapted to be rotatably mounted in the brackets 8 for rotation by any suitable form of drive mechanism such, for example, as a sheave 9 and a belt 10 (see Fig. 1) from a motor or other similar power source (not shown).

In the building up of a package upon the beam 7, the web or fabric 11 may be directed from the weaving apparatus over a series of rolls or other forms of tensioning devices before reaching the wind-up apparatus 1. As illustrated in Fig. 3 of the drawings, the fabric 11 approaches the winding apparatus from above and passes about the under side of an idler 12 which is freely rotatably mounted on the horizontal members 4 of the structure 2. From the idler 12, the fabric 11 is next directed over the stationary rod or bar 13 and under the corresponding rod or bar 14, both of which are secured in a transverse frame 15 disposed in the path of travel of the fabric 11 to the beam 7.

The transverse frame 15 comprises a pair of cross members 16 which, in turn, support the transverse members 17 and 17a. The frame 15 is mounted so as to pivot about a bearing or pivot point 18 on each of the oppositely disposed vertical members 6. This form of mounting of the frame 15 permits the adjustment of the position of the bars 13 and 14 with respect to the plane of the fabric 11 as it passes from the idler 12 to the beam 7 in a manner to be described in detail hereinafter. The bars 13 and 14 are advantageously curved in a plane substantially normal to the plane of the fabric 11 and are provided with flexible tubular coverings 19 and 20, respectively. These tubular coverings 19 and 20 are capable of rotation about the bars 13 and 14 which are rigidly supported by the cross members 16 of the frame against rotation.

At a point substantially intermediate the bars 13 and 14 in the frame 15 is mounted a guide or tiltable roll 21. The roll 21 is advantageously formed with a surface of generally frusto-conical shape and arranged as indicated in the structure illustrated in Fig. 2 with one end thereof mounted in a pivot bracket 22 secured to one of the transverse members 17a as by means of the bracket 23. The end of the roll 21 which is opposite the pivot bracket 22 and is of the greatest cross-sectional diameter is supported so as to be capable of highly flexible adjustment in the tiltable supporting mechanism indicated generally by the reference numeral 24.

The tiltable supporting mechanism is adapted to function through any suitable form of linkage such, for example, as the pivotal connection 25, vertical arms 26 and 27 which are adjustably connected by a turnbuckle 28, a pivotal connection 29, a horizontal arm 30 pivotally mounted in a bracket 31 attached to the apparatus, a pivotal connection 32 and the vertical arm 33 with the diaphragm 34 of a pneumatic diaphragm valve 35. The valve 35 is advantageously supported from the structure 2 as by means of the bracket 36. The vertical arm 33 is secured to the diaphragm 34 of the valve 35 and is additionally provided with a compression spring 37 which is urged between a stop 38 provided on the arm 33 and an abutment plate 39 secured to a plate 40 mounted on the uppermost end of one of the vertical members 6.

The valve 35 may be actuated in any suitable fashion to operate through the linkage above described to raise and lower that end of the roll 21 which is supported by the tiltable supporting mechanism 24. In the apparatus described, a finger 41 is disposed adjacent the one edge of the fabric 11 in its path from the curved bar 14 to the beam 7. The finger 41 is freely pivotally supported in the edge guide 42 in such fashion that as the edge of the fabric 11 moves laterally in either direction with respect to the beam 7 on which it is being collected, the finger 41 will be moved out of a normal vertical position against or by the action of the counterweight 43 to displace a pin 44 seated in a vent hole 45 formed in the edge guide 42.

The pin 44 thus serves to control the venting of air or other suitable fluid retained in the conduit 46 and the bowl portion 47 of the valve 35 for controlling the action of the diaphragm 34 of said valve 35. It will be understood that the edge guide 42 is so constructed that it constantly bleeds fluid at a very slow rate through the vent hole 45 when the pin 44 is in its normal vertical position maintained by the adjustment of the counterweight 43. The action of opening the vent hole 45 in the edge guide 42 instantaneously bleeds all of the fluid from the conduit 46 and the bowl portion 47 of the valve 35 through the connection 48, thereby causing the diaphragm 34 to depress so as to actuate the linkage connecting the diaphragm with the tiltable supporting mechanism 24 to effect the tilting of the roll 21 upwardly with respect to the pivot bracket 22. The seating of the pin 44 tightly in the vent hole 45 has the opposite effect as will be explained hereinafter.

The tiltable supporting mechanism 24 for controlling the action of the roll 21 also includes a guide plate 49 secured in any suitable fashion to the adjacent cross member 16 as shown in Fig. 2. The guide plate 49 (see Fig. 5) has a vertical slot 50 cut therethrough to receive the shaft 51 upon which the roll 21 is freely rotatably mounted. The function of the guide plate 49, therefore, is to translate the motion of the shaft 51 into a simple vertical motion so as to raise and lower the larger end or base of the roll 21 with respect to its vertical support in the mounting 22 at the opposite end thereof.

The operation of the apparatus of the present invention is best understood from reference to Fig. 4 of the drawings in which the extremes of the alternate positions of the roll 21 and the linkage cooperating with the tiltable supporting mechanism 24 to actuate the roll are shown, the one being depicted in full and the other in dotted lines. For the purpose of the explanation, it will be assumed first that the fabric 11 has shifted laterally toward the right to the edge position indicated by reference numeral 53 to cause the finger 41 to be pivoted from its normal vertical position in the edge guide 42, thereby unseating the pin 44 from the vent hole 45 and releasing air supplied by conduit 52 to the bowl 47 of valve 35 and conduit 46.

The release of air from the conduit 46 immediately causes the retraction of the diaphragm 34 of the valve 35, resulting in the arm 33 being depressed by the action of spring 37 while the vertical arms 26 and 27 are raised through the pivotal action of the horizontal arm 30 in the linkage about the point 31. This relationship of the elements of the apparatus results in the actuation of the tiltable supporting mechanism 24, causing the right hand end of the roll 21 to be raised from its normal position to that shown in full lines in Fig. 4. The roll 21 exerts a slight pressure against the right hand edge of the fabric 11, causing the same to shift bodily toward the left or to the full line position of the fabric 11 as seen in Fig. 4, thereby maintaining the proper edge-to-edge relationship of successive layers of the fabric as it is collected upon the beam 7 in the wind-up operation.

It will be apparent that the apparatus described herein will operate in exactly the opposite way in the event that the shift of the fabric 11 is to the left or to the edge position 54. In this instance, the finger 41 will tilt slightly to a position on the opposite side of its normal vertical position from that illustrated in full lines in Fig.

4. This action causes the pin 44 to seat tightly in the vent hole 45 closing off the normal bleeding of the conduit 46 and distending the diaphragm 34. The distension of diaphragm 34 causes the arm 33 to move upward, compressing the spring 37 and pivoting the arm 30 to its illustrated dotted line position, thereby moving the connected arms 26, 27 downwardly. The roller 21 is thus tilted to a position approximating that shown in dotted lines and the fabric 11 is caused to shift toward the right and to assume the full line position thereof.

The counterweight 43 on the horizontally bent portion of finger 41 endeavors at all times to maintain the finger in a normal vertical position. The finger 41 is delicately adjusted so that it may be readily unbalanced by even a very slight lateral movement in either direction of the fabric as it passes through the wind-up apparatus 1 to the beam 7 upon which it is to be collected as a package. A delicate balance of the mechanism is always maintained between the air pressure on the diaphragm 34 of the valve 35 and the spring 37.

There is an essential co-action between the so-called expanding mechanism embodying the curved bars 13 and 14 with the rotatable flexible coverings 19 and 20 in contact with the fabric 11 as it passes through the frame 15 of the apparatus and the elements of the apparatus operating to actuate the roll 21. It is the primary function of the curved bars 13 and 14 of the expanding mechanism to operate to spread apart the edges of the fabric in the course of the wind-up operation to insure the maintenance of the maximum widthwise dimension of the fabric at all times. In the event that the expanding mechanism should fail to maintain the overall width of the fabric, the edge guiding mechanism will be caused to function inadvertently, thereby affecting the uniform edge-to-edge relationship of the successive layers of fabric as they are collected upon the beam 7.

In order to insure the existence of a predetermined, desired relationship between the expanding mechanism and the edge guide mechanism, it is desirable to provide an adjustable locking device 55 as indicated in Fig. 1 of the drawings for adjustably positioning the frame 15 with respect to the fabric 11. It will be understood that the tilting of the frame 15 about the pivot points 18 will determine the extent to which the rotatable flexible coverings 19 and 20 on the bars 13 and 14 contact the fabric 11 as it passes through said frame to the beam 7. The greater the pressure applied by the flexible coverings 19 and 20 against the fabric 11, the greater the tendency to spread apart the edges of the fabric.

It will be apparent that certain modifications may be made in the illustrated embodiment of the invention without in any way departing from the spirit or scope of the inventive concept. Other equally effective forms of linkage may, for example, be employed in actuating the roll 21. Moreover, other suitable forms of actuating means or valve mechanisms may be employed in conjunction with the edge guide mechanism.

While in accordance with the patent statutes one best known embodiment of the invention has been illustrated and described in detail, it is to be particularly understood that the invention is not limited thereto or thereby, but that the inventive scope is defined in the appended claims.

I claim:

1. In an apparatus for winding fabric and the like upon a beam, means for maintaining the uniform width and edge relationship of successive layers of fabric upon the beam comprising expanding means in, and extending substantially transversely of, the path of the fabric to the beam embodying a pair of members in contact with the fabric for spreading apart the edges of the fabric uniformly through its length; means supporting the expanding means and providing adjustment thereof with respect to the fabric; tiltably mounted means disposed between the members of the expanding means and in contact with at least one edge of the fabric for centering the same with respect to the ends of the beam; and means responsive to the lateral movement of an edge of the fabric for actuating the tiltably mounted means.

2. In an apparatus for winding fabric and the like upon a beam, means for maintaining the uniform width and edge relationship of successive layers of fabric upon the beam comprising a frame disposed in generally transverse relation to the longitudinal dimension of the fabric, said frame being mounted for pivotal adjustment about its transverse axis; expanding means in said frame for contacting the fabric and spreading the edges thereof apart as it passes the frame; means tiltably mounted in the frame in contact with the fabric adjacent one edge thereof and co-acting with the expanding means to guide the fabric; and means, the operation of which is initiated by one of the fabric edges to move an end of the tiltably mounted means in a direction substantially normal to the plane of the fabric.

3. In an apparatus for winding fabric and the like upon a beam, means for maintaining the uniform width and edge relationship of successive layers of fabric upon the beam comprising a frame disposed in generally transverse relation to the longitudinal dimension of the fabric; means for controlling the pivotal adjustment of the frame about its transverse axis; expanding means in said frame for contacting the fabric and spreading the edges thereof apart as it passes the frame; means tiltably mounted in the frame in contact with the fabric adjacent one edge thereof and co-acting with the expanding means to guide the fabric; and means, the operation of which is initiated by one of the fabric edges to move an end of the tiltably mounted means in a direction substantially normal to the plane of the fabric.

4. In an apparatus for winding fabric and the like upon a beam, means for maintaining the uniform width and edge relationship of successive layers of fabric upon the beam comprising a frame extending substantially transversely of the fabric as it passes to the beam; a pair of mutually parallel, generally curved bars secured in said frame and extending laterally of the fabric; a flexible covering on the bars mounted for rotation by the fabric with respect thereto; a roll having the shape of a truncated cone freely rotatably mounted on the frame between the bars and disposed adjacent one edge of the fabric for tiltable movement in a direction generally normal to the plane of the fabric; and means, the operation of which is initiated by one of the fabric edges to move one end of the tiltable roll.

5. In an apparatus for winding fabric and the like upon a beam, means for maintaining the uniform width and edge relationship of successive layers of fabric upon the beam comprising a frame pivotally mounted about a horizontal axis and extending substantially transversely of the fabric as it passes to the beam; a pair of mutually parallel, generally curved bars secured in said frame and extending laterally of the fabric; a flexible covering on the bars mounted for rotation by the fabric with respect thereto; a roll having the shape of a truncated cone freely rotatably mounted on the frame between the bars and disposed adjacent one edge of the fabric for tiltable movement in a direction generally normal to the plane of the fabric; means, the operation of which is initiated by one of the fabric edges to move one end of the tiltable roll; and means supporting and adjustably positioning the frame for pivotal movement about its transverse axis.

6. In an apparatus for winding fabric and the like upon a beam, means for maintaining the uniform width and edge relationship of successive layers of fabric upon the beam comprising a frame extending substantially transversely of the fabric as it passes to the beam, said frame being pivotally mounted for rotation about its transverse axis; a pair of mutually parallel, generally curved rolls mounted in the frame for contacting the fabric; a tiltable member on the frame co-acting with the curved rolls to shift the fabric laterally in its path to the beam; and means responsive to the lateral movement of the fabric for tiltably controlling the position of the tiltable member with respect to the curved rolls.

7. In an apparatus for winding fabric and the like upon a beam, means for maintaining the uniform width and edge relationship of successive layers of fabric upon the beam comprising a pivotally mounted frame extending transversely of the path of travel of the fabric to the beam; means adjustably securing the frame in position with respect to the plane of the fabric; a pair of bars mounted transversely of the frame in mutually parallel relation; a flexible covering on said bars freely rotatable with respect thereto and disposed in contact with the fabric; a roll positioned between said bars and having a generally frusto-conically shaped surface; a pivotal mounting on said frame for supporting one end of said roll; a pneumatic diaphragm valve; a finger member disposed adjacent an edge of the fabric as it passes to the beam and actuatable by the lateral movement of the fabric edge; and a linkage connecting the diaphragm of the valve and the end of the roll opposite the pivotal mounting for tilting the roll about said mounting.

RAYMOND E. SOLLIDAY.

REFERENCES CITED

The following references are of record in the file of this patent:

UNITED STATES PATENTS

| Number | Name | Date |
| --- | --- | --- |
| 34,960 | Helm | Apr. 15, 1862 |
| 198,787 | Birch | Jan. 1, 1878 |
| 221,576 | Kerr | Nov. 11, 1879 |
| 654,587 | Ashworth | July 31, 1900 |
| 920,122 | Farnworth | May 4, 1909 |
| 1,343,385 | Bolton | June 15, 1920 |
| 1,347,714 | Rowley | July 27, 1920 |
| 1,465,479 | Olb | Aug. 21, 1923 |
| 1,599,257 | Voegeli | Sept. 7, 1926 |
| 1,739,993 | Tandel | Dec. 17, 1929 |
| 1,982,685 | Muller | Dec. 4, 1934 |
| 2,064,993 | Sperry | Dec. 22, 1936 |
| 2,066,306 | Horton | Dec. 29, 1936 |
| 2,188,665 | Sperry | Jan. 30, 1940 |
| 2,311,674 | Lilja | Feb. 23, 1943 |